US011834377B2

(12) United States Patent
Krausz et al.

(10) Patent No.: US 11,834,377 B2
(45) Date of Patent: Dec. 5, 2023

(54) EROSION-RESISTANT CERAMIC MATERIAL, POWDER, SLIP AND COMPONENT

(71) Applicant: Siemens Energy Global GmbH & Co. KG, Munich (DE)

(72) Inventors: Ivo Krausz, Berlin (DE); Friederike Lange, Ratingen-Lintorf (DE); Christian Nikasch, Mülheim an der Ruhr (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 17/110,559

(22) Filed: Dec. 3, 2020

(65) Prior Publication Data

US 2021/0087115 A1 Mar. 25, 2021

Related U.S. Application Data

(62) Division of application No. 16/466,070, filed as application No. PCT/EP2017/078718 on Nov. 9, 2017, now Pat. No. 11,028,018.

(30) Foreign Application Priority Data

Dec. 8, 2016 (DE) ...................... 10 2016 224 443.4

(51) Int. Cl.
*C04B 35/117* (2006.01)
*C04B 35/443* (2006.01)
*F01D 5/28* (2006.01)

(52) U.S. Cl.
CPC ...... *C04B 35/117* (2013.01); *C04B 2235/322* (2013.01); *C04B 2235/3222* (2013.01); *C04B 2235/5284* (2013.01); *C04B 2235/6027* (2013.01); *C04B 2235/763* (2013.01); *C04B 2235/9669* (2013.01); *F01D 5/288* (2013.01); *F05D 2300/2112* (2013.01)

(58) Field of Classification Search
CPC ........................... C04B 35/117; C04B 35/443
See application file for complete search history.

(56) References Cited

U.S. PATENT DOCUMENTS

| | | | | |
|---|---|---|---|---|
| 4,220,268 | A * | 9/1980 | Fehling | ............... B22D 41/28 222/600 |
| 4,732,741 | A | 3/1988 | Duncan et al. | |
| 6,165,926 | A | 12/2000 | Kriechbaum et al. | |
| 7,304,010 | B2 * | 12/2007 | Hayashi | ............. C04B 41/5346 501/153 |
| 9,108,885 | B2 * | 8/2015 | Todd | ................. C04B 35/111 |
| 10,890,380 | B2 | 1/2021 | Thibodeau et al. | |
| 2004/0142812 | A1 | 7/2004 | Buchberger et al. | |
| 2005/0187094 | A1 * | 8/2005 | Hayashi | ............... C04B 41/009 501/153 |
| 2006/0196123 | A1 * | 9/2006 | Marlin | ................ C09K 3/1427 51/293 |
| 2008/0176020 | A1 | 7/2008 | Heng et al. | |
| 2009/0181257 | A1 | 7/2009 | Grote | |
| 2010/0081556 | A1 | 4/2010 | Heng et al. | |
| 2011/0077141 | A1 | 3/2011 | Walker et al. | |
| 2011/0237420 | A1 | 9/2011 | Grote et al. | |
| 2014/0057773 | A1 | 2/2014 | Aneziris et al. | |
| 2020/0407279 | A1 * | 12/2020 | Atsuji | ............. H01L 21/68757 |

FOREIGN PATENT DOCUMENTS

| | | |
|---|---|---|
| CN | 85102067 A | 1/1987 |
| CN | 1138565 A | 12/1996 |
| CN | 1143618 A | 2/1997 |
| CN | H0987009 A | 3/1997 |
| CN | 1774487 A | 5/2006 |
| CN | 1887789 A | 1/2007 |
| CN | 101215158 A | 7/2008 |
| CN | 101234905 A | 8/2008 |
| CN | 101367663 A | 2/2009 |
| CN | 101987792 A | 3/2011 |
| CN | 102153335 A | 8/2011 |
| CN | 102227389 A | 10/2011 |
| CN | 102617169 A | 8/2012 |
| CN | 102858713 A | 1/2013 |
| CN | 103121850 A | 5/2013 |
| CN | 103896611 A | 7/2014 |
| CN | 104446390 A | 3/2015 |
| CN | 104496493 A | 4/2015 |
| CN | 104909735 A | 9/2015 |
| CN | 105461291 A | 4/2016 |
| CN | 106220149 A | 12/2016 |
| CN | 109020579 A | 12/2018 |
| CN | 105859263 B | 3/2019 |
| DE | 102005036394 A1 | 2/2007 |
| EP | 1741980 A1 | 1/2007 |
| EP | 1880984 A2 | 1/2008 |
| EP | 2169311 A1 | 3/2010 |
| GB | 676538 A | 7/1952 |

(Continued)

OTHER PUBLICATIONS

Machine translation of CN106220149. (Year: 2016).*
Paranjpe, "Alpha, Beta and Gamma Alumina as a ccatalyst—A Review", Pharma Innovation Journal 2017;6(11):236-238. (Year: 2017).*
Notice of Allowance dated Feb. 11, 2021 for U.S. Appl. No. 16/466,070.
Corrected Notice of Allowance dated Mar. 3, 2021 for U.S. Appl. No. 16/466,070.
International Search Report in related PCT Application No. PCT/EP2017/078718, dated Jan. 11, 2018. 3 pages.
Database WPI: Week 201279; Thomson Scientific, London, GB; AN 2012-N83112; XP002776897, & CN 102 617 169 A (Univ Wuhan Sci & Technology); 2012.
Zawati Harun et al: "Effect of MgO Additive on Microstructure of Al sub2 /subO sub3 /sub", Advanced Materials Research, vol. 488-489, pp. 335-339, XP55679977, DOI: 10.4028/www.scientific.net/AMR.488-489.335; 2012.

(Continued)

*Primary Examiner* — Karl E Group
(74) *Attorney, Agent, or Firm* — Schmeiser, Olsen & Watts LLP

(57) ABSTRACT

The use of magnesium oxide, reactive alumina and aluminium oxide as a base provides for a new erosion-resistant material upon sintering.

10 Claims, No Drawings

(56) References Cited

FOREIGN PATENT DOCUMENTS

| GB | 1189853 A | * | 1/1970 | ............. C04B 35/10 |
|---|---|---|---|---|
| GB | 1394834 A | | 5/1975 | |
| GB | 2226021 A | | 6/1990 | |
| JP | 05009064 A | * | 1/1993 | |
| JP | 2011047563 A | | 3/2011 | |
| RU | 2140407 C1 | | 10/1999 | |
| RU | 2571876 C1 | | 12/2015 | |
| RU | 2632078 C1 | * | 10/2017 | |
| RU | 2699467 C1 | * | 9/2019 | |
| WO | 03053879 A1 | | 7/2003 | |
| WO | 2008091713 A2 | | 7/2008 | |
| WO | 2018103994 A1 | | 6/2018 | |

OTHER PUBLICATIONS

Ex Parte Quayle issued Aug. 14, 2020 for U.S. Appl. No. 16/466,070.
Huang, Xiaojun: "Effect of doped oxides on the density of alumina ceramic bodies"; Annual Report of China Academy of Engineering Physics; pp. 479-480, 31. Dec. 2002.

* cited by examiner

EROSION-RESISTANT CERAMIC MATERIAL, POWDER, SLIP AND COMPONENT

CROSS-REFERENCE TO RELATED APPLICATIONS

This application is a divisional application of U.S. application Ser. No. 16/466,070, filed Jun. 3, 2019, entitled "EROSION-RESISTANT CERAMIC MATERIAL, POWDER, SLIP AND COMPONENT," now U.S. Pat. No. 11,028, 018, which claims priority to PCT Application No. PCT/EP2017/078718, having a filing date of Nov. 9, 2017, which is based on German Application No. 10 2016 224 443.4, having a filing date of Dec. 8, 2016, the entire contents all of which are hereby incorporated by reference.

FIELD OF TECHNOLOGY

The following relates to an erosion-resistant ceramic material, a powder, slip and a component.

BACKGROUND

Ceramic heat shields (CHS) as example of components made of ceramic material display corrosion and erosion on the hot gas side during use. This process is due to the corrosion of the mullite present in the CHS material, which is converted into secondary α-alumina on contact with the hot gas. This secondary α-alumina has a lower mechanical strength than the surrounding CHS material. This secondary α-alumina is ablated by the hot gas stream and the larger microstructural constituents of the component composed of the ceramic are exposed. When these microstructural constituents are exposed to a certain degree, they are detached from the CHS surface.

The ceramic heat shields CHS in the CHS series of the combustion chamber which are most affected by corrosion and erosion are often given an aluminum oxide coating on the hot gas side. This coating is applied by a slip spraying process or a flame spraying process to the CHS.

These coatings often have a relatively fine-grain structure which in plant operation tends to suffer from after-sintering, crack formation and premature disintegration.

A flame coating, on the other hand, is relatively dense, brittle and cannot follow the deformations of the CHS in plant operation. The consequences here are also crack formation in the coating and detachment of the coating constituents, partly due to the relatively poor adhesion of the flame coating to the CHS base material. The life of these coatings is relatively limited. The time for which the CHS base material is afforded protection against hot gas corrosion is thus significantly limited. The detached coating itself represents an additional source of particles which are accelerated in the direction of the turbine and can there cause damage to the turbine blade TBC.

SUMMARY

The ceramic comprises at least (in % by weight): in particular consists of, aluminum oxide as matrix material, in particular in an amount of from 92.0% to <99.0%, and mullites, in particular in a proportion of 8.0%-1.0%.

The term ceramic is used here as a general generic term and encompasses every embodiment as blank, green body, powder, slip, end product, massive or as layer.

α-Alumina or tabular aluminas are used as aluminum oxide.

The ceramic contains reactive alumina as aluminum oxide in order to reduce the water content and in order to improve the processability is present in a ceramic slip.

Preference is given to no silicon oxide and/or no silicon compounds being present in the ceramic or powder.

The powder at least comprises reactive magnesium oxide (MgO) in an amount of from 0.1% to 4.0% in order to form spinel ($MgAl_2O_4$) with the aluminum oxide present and from 96.0% to 99.9% of aluminum oxide.

The powder contains γ'-aluminum oxide or α-alumina or tabular aluminas as aluminum oxide or contains reactive alumina as aluminum oxide as additives for reducing the water content and for improving the processability in a ceramic slip, in particular in a proportion of from 10% by weight to 25% by weight.

The tabular alumina has at least three different particle size fractions and the tabular aluminas have a maximum particle size of up to 10 mm.

The reactive alumina has at least two different particle size fractions.

Here, the term particle size fraction refers to a powder fraction having a Gaussian or Maxwell or similar distribution. Different particle size fraction means that the particle size distributions differ significantly.

The reactive magnesium oxide (MgO) has a citric acid activity of from 10 seconds to 250 seconds.

The slip comprises at least one liquid, in particular water, and a powder as described above.

A component is produced from the ceramic, the powder or the slip.

Mullite as corrosion-prone component in the material for ceramic heat shields is, in particular, avoided completely in the new material. The remaining α-alumina in the present material is significantly more stable to hot gas. The previously observed corrosion of mullite and the associated formation of mechanically unstable secondary α-alumina therefore does not occur. The ablation of material from this ceramic is thereby reduced to the far lower corrosion and erosion of the α-alumina.

The formation of an alternative binder phase in the ceramic is achieved by addition of a small amount of reactive MgO (from 0.1% by weight to 4.0% by weight). In the production of a component composed of the ceramic, this reactive MgO functions as temporary binder by formation of $Mg(OH)_2$. In the firing process, magnesium oxide, which is made available by $Mg(OH)_2$, reacts with finely particular aluminum oxide from the remaining mix to form spinel. This spinel compound ($MgAl_2O_4$) replaces the previous mullite binding in the finished component. A two-phase system (α-alumina and spinel) is again achieved as a result of the spinel formation. These two-phase systems feature an improved temperature change resistance due to the slightly different coefficients of thermal expansion of the individual phases and the resulting microcracks in the microstructure.

For the ceramic, reactive alumina is used in order to reduce the water content and to improve the processability. A further positive effect brought about by this reactive alumina is the very fine pore distribution in the ceramic structure achieved thereby. While the total porosity in a component composed of the ceramic is at about the same level as in other ceramic materials, the typical average pore diameter here is, at <5 μm, significantly smaller than in the case of other cast CHS materials (typically from 5 μm to 20 μm). This fine porosity likewise has a positive effect on the thermal shock behavior of the ceramic as massive component. This reactive alumina is used in a proportion of from 10% by weight to 25% by weight in the total mix.

The remaining raw materials of the powder consist of tabular aluminas of various particle size fractions up to a maximum particle size of up to 10.0 mm. The particle size distribution (=1 fraction) of reactive alumina, binder (reactive MgO) and other mixed constituents (tabular aluminas) is matched in such a way that firstly a sufficient flowability and thus processability is achieved in the production of the material but secondly the required strength and thermal shock resistance of the material for operation in a gas turbine is also achieved.

The ceramic is, due to the absence of a proportion of mullite, significantly more stable to hot gas and thus more insensitive to corrosion and erosion than all other CHS materials used at present.

The porosity of a component composed of the ceramic or of the powder is optimized in the direction of significantly more and finer pores, as a result of which the thermal shock resistance is significantly improved, by use of a dispersing alumina.

The use of reactive MgO functions as temporary binder phase in the production of the CHS. In this way, it is possible to dispense with the use of other binders which in the future finished product could lead to adverse accompanying phenomena.

The reactive MgO forms a durable and hot-gas-stable spinel phase during firing of the ceramic. This spinel phase forms a durable bond between the relatively coarse mixed constituents in the fine-grain matrix.

Thanks to its spinel formation, the fine porosity and the other microstructure, α-alumina achieves, as only previously known refractory material without a proportion of mullite, sufficient thermal shock resistance in order to attain the required strength values in a standard test series on a hot HCF test stand (simulation of the thermal and mechanical stresses on a CHS during plant operation).

Due to the reduced corrosion and erosion of CHS composed of α-alumina compared to CHS made of other CHS materials, the life in erosion-prone regions of the combustion chamber is significantly lengthened.

The replacement rate of the ceramic heat shields due to ablation of material decreases considerably, the life of the CHS increased.

The times for the required CHS replacement in these CHS series thus decreases, as a result of which the outage time for the total plant can also be shortened.

Due to the significantly reduced ablation of material from the CHS surface, fewer particles which could have erosive effects on the turbine blade coating are carried in the direction of the turbine. This significantly increases the life of the turbine blade TBC. Significantly longer operating times for turbine blades are made possible.

The material is suitable for all applications in which a refractory material is subjected to thermal shock stresses and additionally has to withstand hot gas corrosion.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A powder comprising (in % by weight):
from 96.0% to 99.9% of aluminum oxide; and
reactive magnesium oxide in an amount of from 0.1% to 4.0%, to form spinel with the aluminum oxide present, the reactive magnesium functioning as a temporary binder phase;
wherein aluminum oxide is present as tabular alumina.

2. The powder as claimed in claim 1, wherein the reactive magnesium oxide has a citric acid activity of from 10 seconds to 250 seconds.

3. The powder as claimed in claim 1, wherein the tabular alumina has at least three different particle size fractions.

4. The powder as claimed in claim 1, wherein the tabular alumina has a maximum particle size of up to 10 mm.

5. The powder as claimed in claim 1, wherein no silicon oxide is present in the powder.

6. The powder as claimed in claim 1, wherein no silicon compounds are present in the powder.

7. A powder comprising (in % by weight):
from 96.0% to 99.9% of aluminum oxide; and
reactive magnesium oxide in an amount of from 0.1% to 4.0%, to form spinel with the aluminum oxide present, the reactive magnesium functioning as a temporary binder phase;
wherein aluminum oxide is present as reactive alumina to reduce a water content, and the reactive alumina is used in a proportion from 10% by weight to 25% by weight in a total mix.

8. The powder as claimed in claim 7, wherein the reactive alumina has at least two different particle size fractions.

9. The powder as claimed in claim 7, wherein no silicon oxide is present in the powder.

10. The powder as claimed in claim 7, wherein no silicon compounds are present in the powder.

* * * * *